United States Patent [19]

Dixon

[11] Patent Number: 5,768,573

[45] Date of Patent: Jun. 16, 1998

[54] METHOD AND APPARATUS FOR COMPUTING A REAL TIME CLOCK DIVISOR

[75] Inventor: Robert Christopher Dixon, Austin, Tex.

[73] Assignee: International Business Machines Corporation, Armonk, N.Y.

[21] Appl. No.: 753,119

[22] Filed: Nov. 20, 1996

[51] Int. Cl.$^6$ .................................................. G06F 1/04
[52] U.S. Cl. ............................................................. 395/557
[58] Field of Search ................... 395/557; 364/761–767, 364/703

[56] References Cited

U.S. PATENT DOCUMENTS 3,811,314  5/1974  Anouchi .
3,824,385  7/1974  Kiencke ................................. 364/703
4,266,281  5/1981  Struger et al. .
5,052,031  9/1991  Molloy ................................... 375/376
5,077,519  12/1991  Markow et al. .
5,206,826  4/1993  Mori et al. ......................... 364/766 X
5,493,523  2/1996  Huffman .............................. 364/766

Primary Examiner—Thomas M. Heckler
Attorney, Agent, or Firm—David A. Mims, Jr.

[57] ABSTRACT

A method and apparatus for generating a divisor having a variable value for real time calculations. A microprocessor's time base register is used to generate the divisor. All interrupts and refreshes are disabled on the microprocessor before calculating the divisor. The microprocessor's time base register is cleared and allowed to count the number of clock ticks in a one second interval. The time base register is read and the value used as a divisor for real time calculations.

11 Claims, 4 Drawing Sheets

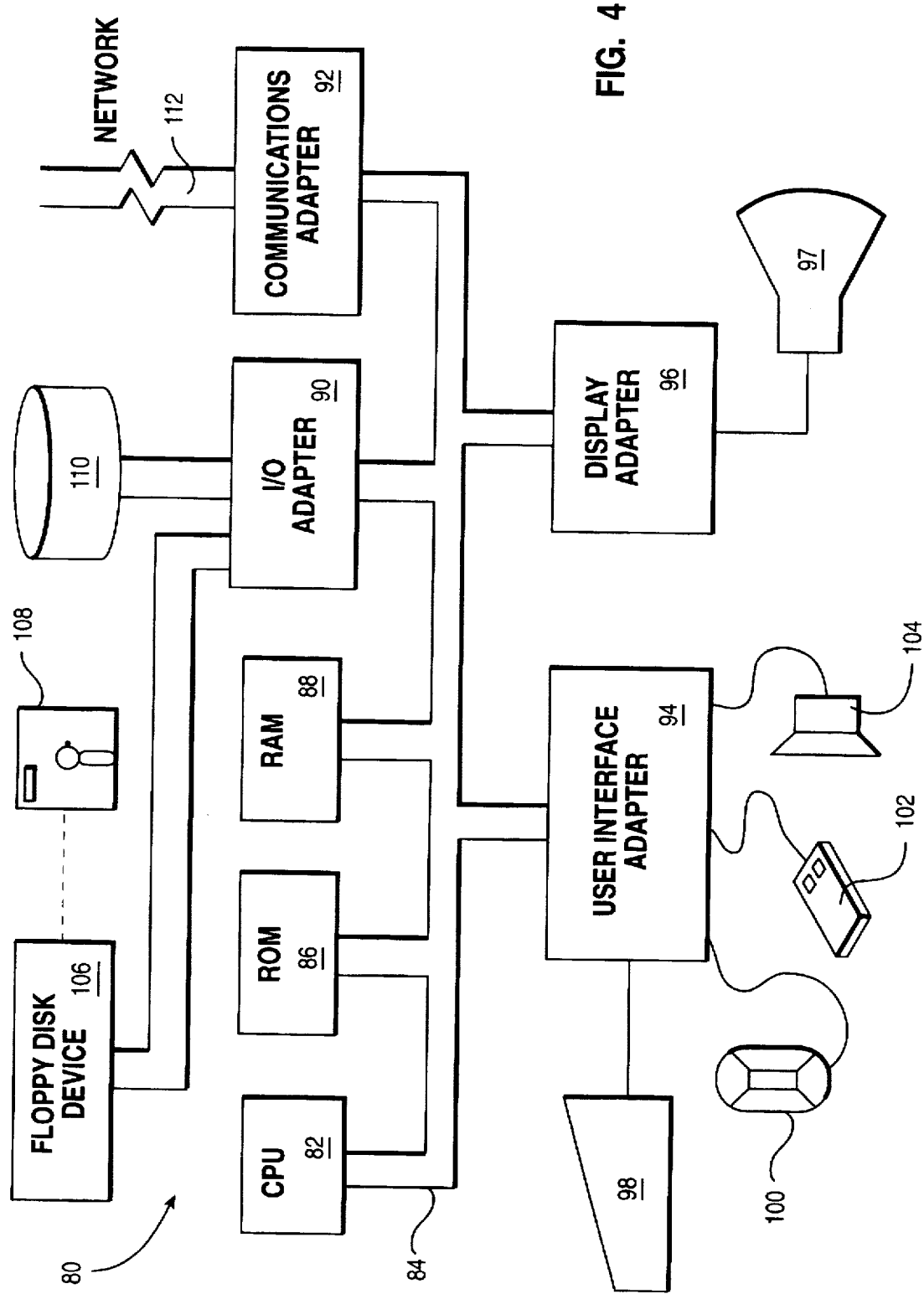

METHOD AND APPARATUS FOR COMPUTING A REAL TIME CLOCK DIVISOR

FIELD OF THE INVENTION

The present invention relates to data processing systems, and more particularly, to generating a divisor used in a computer workstation for time calculations.

BACKGROUND OF THE INVENTION

Modern computers have increasingly seen skyrocketing clock rates allowing faster instruction execution and increased resolution for counter functions/real time clock functions (i.e. time-of-day clock, clock comparator, CPU timer and interval timer). Traditionally, counter functions have been provided by counting bus clock ticks and dividing the ticks in a given interval by a divisor equaled to the ticks/second. The divisor, thus obtained, has a constant value which applies to all machines manufactured, regardless of a particular machine's actual behavior (i.e., aging rate, temperature effects, crosstalk, noise, drift, etc). Through seemingly straightforward, the generation of counter functions have frequently resulted in timing errors resulting from aging and manufacturing variations of the various timing elements used to generate the bus clock. The timing errors are accumulated over days and months and result from the inability of the constant value divisor to compensate for a particular machine's actual behavior.

One prior art approach integrates the counter functions/ real time counter functions on a single chip or into a few Very Large Scale Integrated (VLSI) chips. This kind of integration often yields a more reliable system because fewer, solder connections are required through the planar (system) board, along with reduced costs. This approach, nonetheless, is still susceptible to the problem of implementations where the technology may be inadequately known at the design stage. The clock frequency may not be finalized and physical design parameters originally used may change. The integrated chip designer is forced to provide a design which meets performance requirements for a wide range of applications to avoid the possibility of sorting chips to particular time characteristics. Another problem with this approach is the possibility of hardware clock drift (e.g., clocks may advance approximately one second after one second of true time, for example, a clock may have a drift rate of plus or minus one percent, meaning that after one second of true time, a fast clock can advance 1.01 seconds whereas a slow clock may only advance 0.99 seconds). Thus after one second of true time, clocks that are initially perfectly synchronized may differ in their readings by as much as 0.02 seconds. The difference in readings gets worse over time so that after enough real time, the clocks become useless.

Consequently, it would be desirable to provide a variable divisor for the generation of counter functions that compensates for manufacturing variations and yields a more accurate result for timer functions.

SUMMARY OF THE INVENTION

This invention relates to a method and apparatus for generating a divisor having a variable value for real time clock calculations in a computer system. A microprocessor's time base register is used to generate the divisor. The invention disables all interrupts and refresh before calculating the divisor. The time base register is then cleared and is allowed to read the number of clock ticks in a one second interval. The time base register can now be read and the value used as a divisor for real time calculations in the computer system. After reading the time base register, the interrupts and refresh are again enabled and the microprocessor allowed to resume normal operation.

BRIEF DESCRIPTION OF THE DRAWINGS

FIG. 4 is a pictorial of a workstation/computer system where the invention may be practiced.

DETAILED DESCRIPTION OF THE EMBODIMENTS

This invention provides a method and apparatus for generating a divisor used in real time clock (RTC) calculations in a computer system. A real time clock, as used in this invention is a counter, or a divisor and software code designed to track time as a function on the counter value. The divisor is the number of bus clock ticks in one second. Hence the number of bus clock ticks accumulated, divided by the divisor gives seconds and fractions of seconds as the result. In the prior art, the divisor is assigned a constant value which cannot compensate for manufacturing and aging errors.

Figure 1:
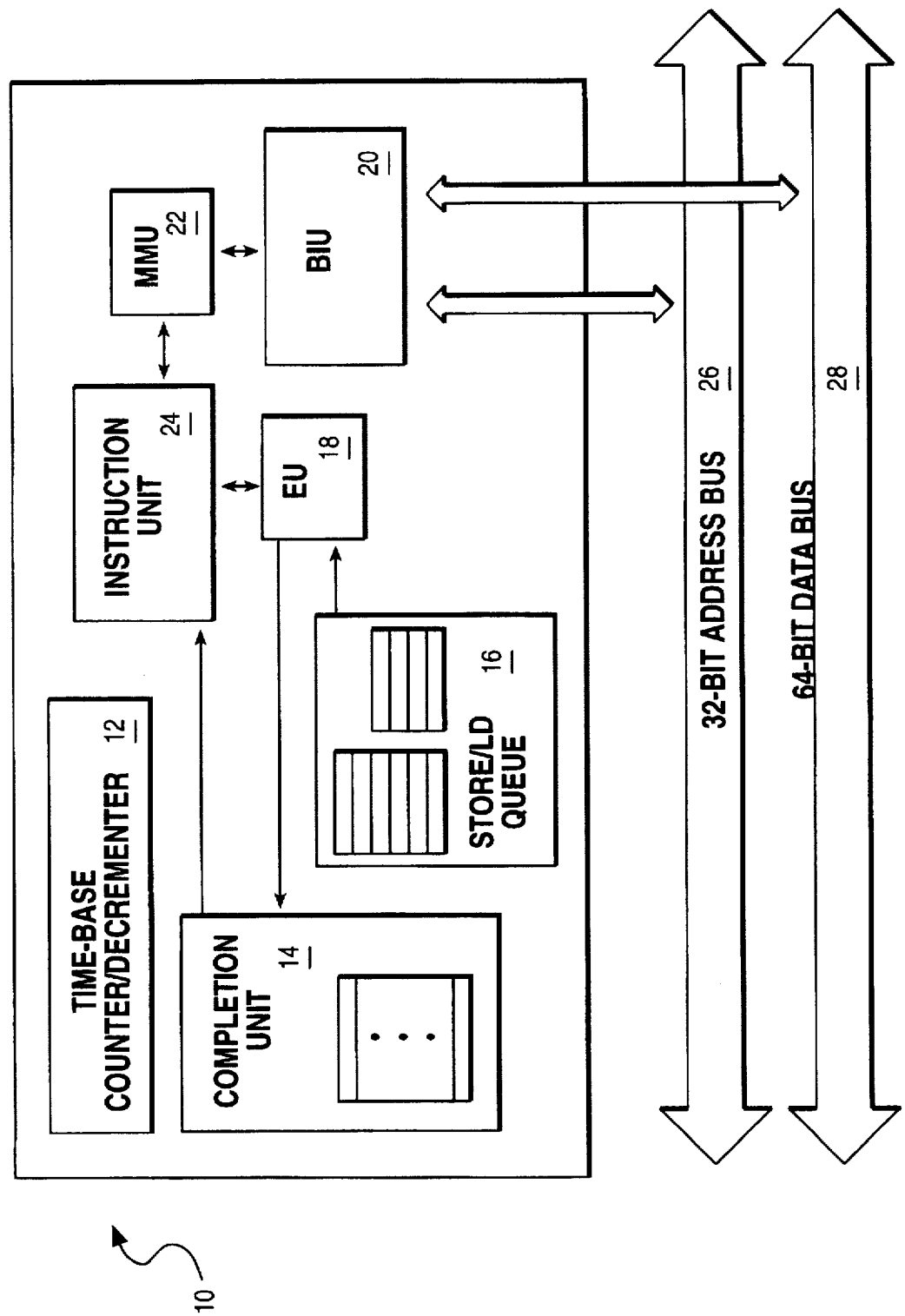
FIG. 1 is an illustrative embodiment of a microprocessor where the present invention may be practiced.

Referring now to FIG. 1, there is shown a pictorial representation of a microprocessor 10 where the invention may be practiced. In the preferred embodiment, microprocessor 10 is a PowerPC 604, manufactured by the IBM Corporation. The PowerPC 604 is a reduced instruction set computer (RISC) microprocessor with a 32-bit address bus 26 and a 64-bit data bus 28. The address bus 26 and data bus 28 are provided to external devices through bus interface unit 20. An instruction unit 24 is connected to bus interface unit 20 through memory management unit 22. The memory management unit 22 provides the PowerPC 604 with the ability to translate logical addresses to physical addresses for memory accesses, I/O accesses, direct-store accesses, and provides access protection on blocks and pages of memory. An execution unit 18 contains a floating-point unit, branch processing unit, load/store unit and three integer units. A completion unit 14 retires an instruction when all instructions ahead of it have been completed and the instruction has finished execution. The PowerPC 604 has a store/load queue 16 for the execution unit 18. The PowerPC 604 contains a number of miscellaneous registers including a Time Base (TB) register and a decrementer register 12. The TB is a 64-bit structure that maintains the time of day and operates interval timers. The TB consists of two 32-bit registers time base upper (TBU) and time base lower (TBL). Both 32-bit registers are accessible by user level instructions. The decrementer register 12 is a 32-bit decrementing counter that provides a mechanism for causing a decrementer exception after a programmable delay. The frequency is a subdivision of the processor clock. Additional details about the operation of the PowerPC's major components, including the Time Base and Decrementer registers, may be found in the *PowerPC Microprocessor Family: The Programming Environments* manual and the *PowerPC 604: RISC Microprocessor User's Manual.*

Figure 2:
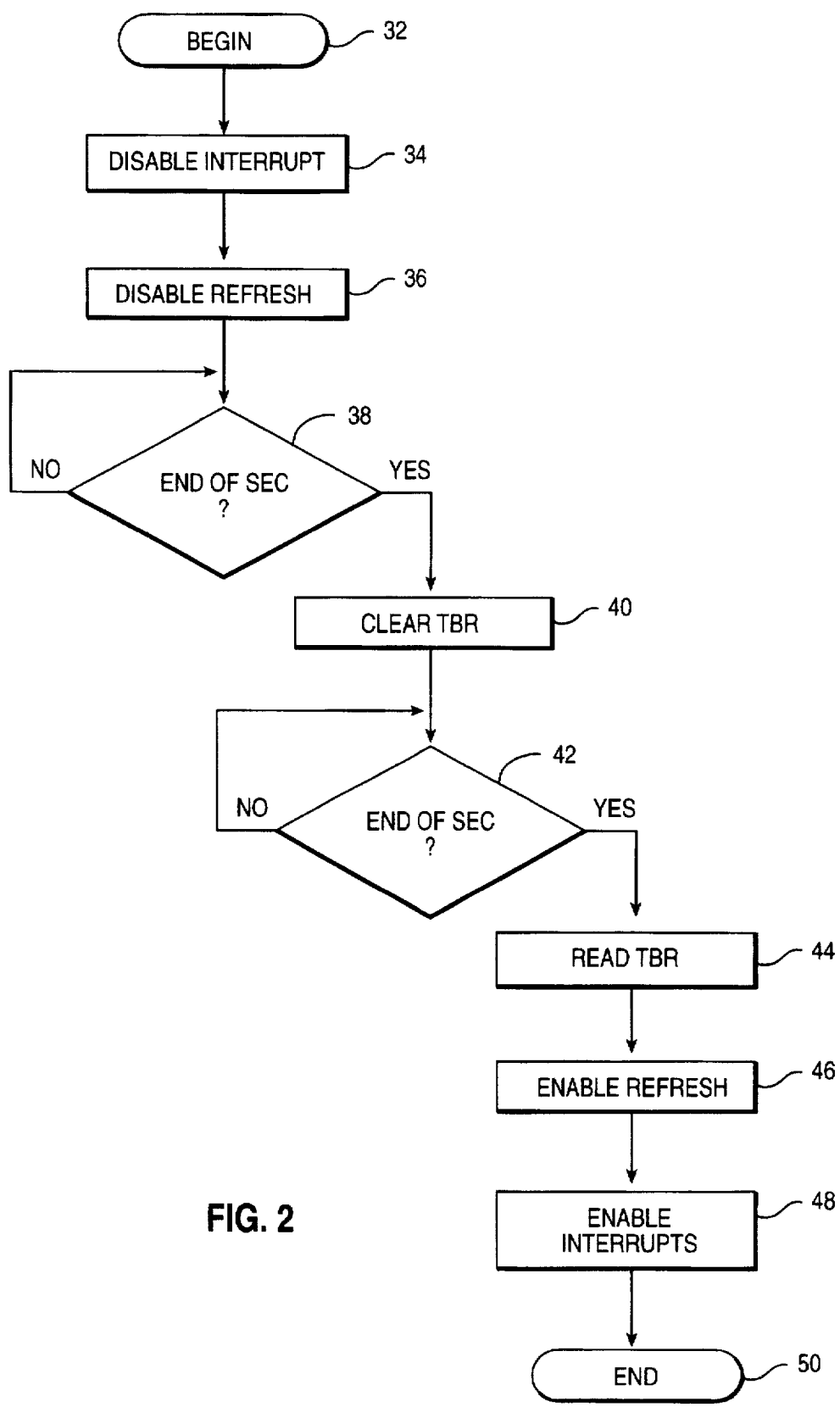
FIG. 2 is a flow diagram of a procedure to compute a divisor value using a polling method as disclosed by this invention.

Referring now to FIG. 2, there is illustrated a flow diagram showing the procedure for computing a divisor value using the invention. The procedure represents code executed by power on initialization code in the PowerPC 604, and not the operating system. The procedure starts at block 32 and proceeds immediately to block 34 where all interrupts are disabled. At block 36, the procedure causes all ISA (Industry Standard Architecture) bus refreshes to be disabled. A check is carried out at block 38 to determine if the external real time clock has detected the end of a second. If NO, the procedure waits until the external real time clock has detected the end of a second. If YES, at block 40, the procedure clears the PowerPC Time Base Register. At block 42, the procedure waits for the external real time clock to detect the end of a second. In the preferred embodiment, the real time clock runs at a 32.678 kHZ rate which is a binary number. A binary divide of 32.678 kHZ gives seconds as output. The real time clock device has an internal register that the microprocessor may read that indicates a second has elapsed. Essentially a bit is set each time a second has elapsed. One skilled in the art will also appreciate that the RTC has an interrupt output. The interrupt can generate periodic interrupts. When implemented, the RTC can provide one interrupt per second. This interrupt then signals the microprocessor that a second has elapsed, since the last RTC interrupt. Returning to block 42, if a second has not been detected, the procedure enters a loop awaiting detection of the end of a second. If a second has been detected, at block 44 the procedure reads the time base register to determine the ticks/second. At block 46, the procedure enables ISA bus refresh, enables interrupts at block 48, and ends at block 50. The ticks/second generated by this procedure may be read and used as a divisor when passed to the operating system. This procedure represents the generation of a divisor using a polling method.

Figure 3:
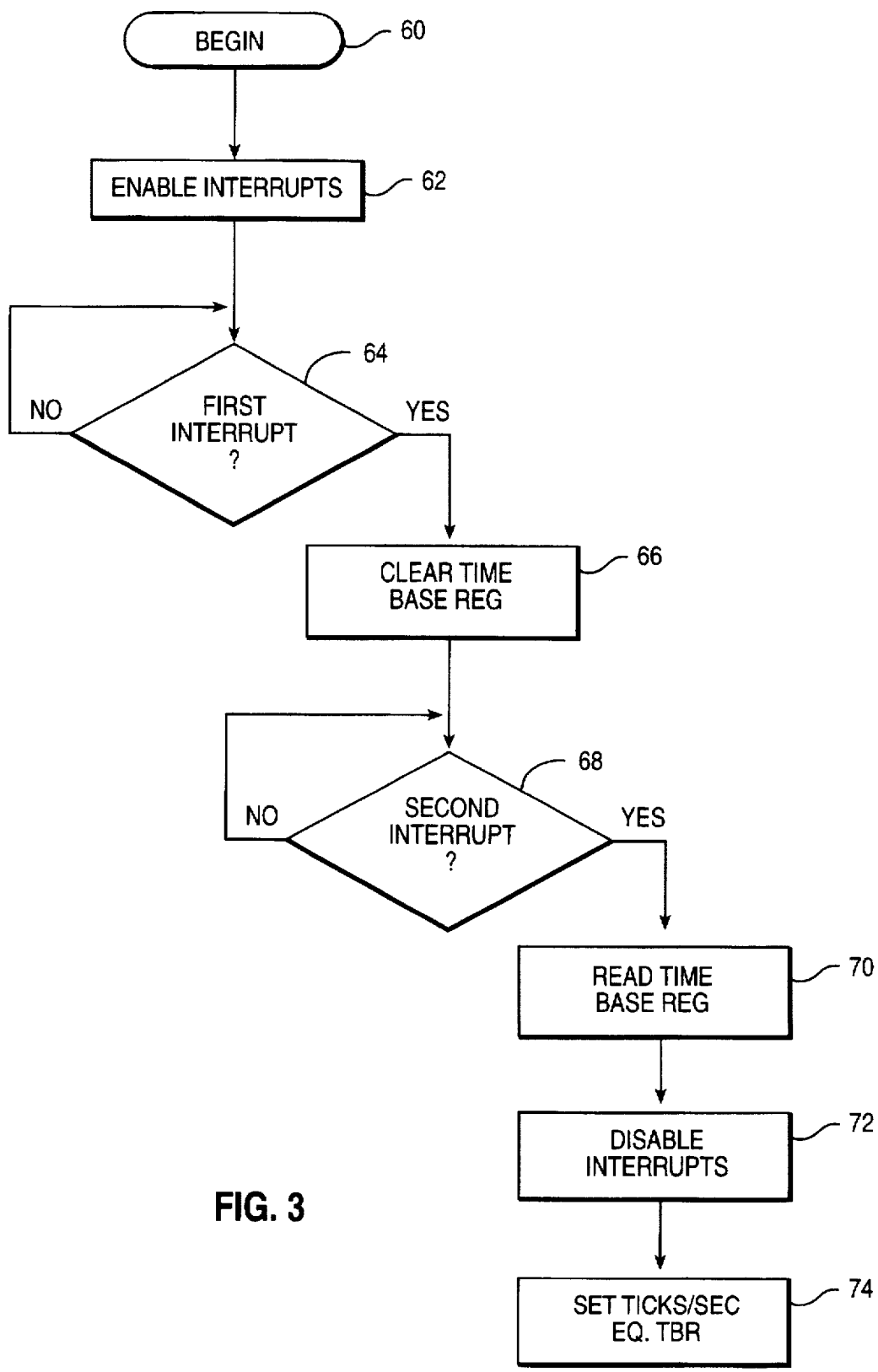
FIG. 3 is a flow diagram of a procedure for computing a divisor using an interrupt method.

Referring now to FIG. 3, an alternative procedure is shown in a flow diagram for generating a divisor using an interrupt method. The procedure begins at block 60 and proceeds immediately to block 62 where the RTC interrupt is enabled from external sources, with one interrupt per second. At block 64, the procedure determines if the first interrupt from an external source has occurred. If NO, the procedure waits for the occurrence of the external interrupt. If YES, processing proceeds to block 66 where the time base register is cleared. At block 68, the procedure determines if a second interrupt from an external source has occurred. If NO, the procedure continues to wait for the occurrence of the interrupt. If YES, processing proceeds to block 70 where the time base register is read. The procedure then disables all interrupts as shown in block 72, and sets the ticks/second equal to the value read from the time base register as shown in block 74. The number of ticks/second read, is used as a divisor by passing it to the operating system for use in real time clock calculations.

Referring now to FIG. 4, there is shown a workstation/computer system 80 where the invention may be practiced. The workstation 80, contains a CPU/microprocessor 82 such as the PowerPC 604, connected to random access memory (RAM) 88, read only memory (ROM) 86, through a bus 84. The CPU 82, is capable of communicating with a plurality of Input/Output (I/O) devices through I/O adapter 90. Hard disk storage 110, provides permanent storage of data/information for use by the CPU 82. A floppy disk device 106, provides means for inputting data from a computer program product having a computer readable medium such as a floppy diskette 108. One skilled in the art will appreciate that the computer program of this invention may be inputted to the CPU 82, via the floppy diskette 108. A display monitor 97, is provided to allow a user to observe the execution of data on the CPU 82. Data can also be inputted to the CPU 82, through keyboard 98, and microphone 100. Data displayed on monitor 97, can be manipulated using mouse 102. Output from programs operating on CPU 82, may be obtained over speaker 104. The workstation 80 may be connected to a network (not shown), through communication adapter 112.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system having a microprocessor, for generating a divisor for use in real time calculations, comprising the steps of:

disabling all interrupts on said microprocessor in said computer system;

disabling all refreshes on said microprocessor in said computer system;

enabling a register on said microprocessor to count the number of clock signals in a predetermined time period;

reading said number of clock signals in said predetermined time period in said register and using said count as said divisor.

2. The method of claim 1 further comprising the step of:

enabling all bus refresh operation on said microprocessor following said reading step; and enabling all interrupts on said microprocessor.

3. The method of claim 1 wherein the predetermined time is equal to one second.

4. The method of claim 1, wherein the step of enabling a register further comprises the steps of:

clearing the register on said microprocessor; and enabling the register to perform a count of the number of clock signals in said predetermined time period.

5. An apparatus for generating a divisor for use in real time calculations, comprising:

means for disabling all interrupts on said microprocessor in said computer system;

means for disabling all refreshes on said microprocessor in said computer system;

means for enabling a register on said microprocessor to count the number of clock signals in a predetermined time period;

means for reading said number of clock signals in said predetermined time period in said register and using said count as said divisor.

6. The apparatus of claim 5 further comprising:

means for enabling all bus refresh operation on said microprocessor following said means for reading; and means for enabling all interrupts on said microprocessor.

7. The apparatus of claim 5, wherein the means for enabling a register further comprises:

means for clearing the register on said microprocessor; and means for enabling the register to perform a count of the number of clock signals in said predetermined time period.

8. The apparatus of claim 5 wherein the predetermined time is equal to one second.

9. A computer program product having a computer readable medium having computer program logic recorded thereon for generating a divisor for use in real time calculations, comprising:

computer readable means for disabling all interrupts on said microprocessor in said computer system;

computer readable means for disabling all refreshes on said microprocessor in said computer system;

computer readable means for enabling a register on said microprocessor to count the number of clock signals in a predetermined time period; and computer readable means for reading said number of clock signals in said predetermined time period in said register and using said count as said divisor.

10. The computer program of claim 9 further comprising:

computer readable means for enabling all bus refresh operation on said microprocessor following said means for reading; and computer readable means for enabling all interrupts on said microprocessor.

11. The computer program of claim 9, wherein the computer readable means for enabling a register further comprises:

computer readable means for clearing the register on said microprocessor; and computer readable means for enabling the register to perform a count of the number of clock signals in said predetermined time period.

* * * * *